Nov. 25, 1969 J. R. BOYKIN 3,480,881

CIRCUITRY FOR SIMULTANEOUSLY MODULATING AND AMPLIFYING A CARRIER SIGNAL

Filed Aug. 19, 1966 4 Sheets-Sheet 1

WITNESSES:

Bernard R. Gieguez

James F. Young

INVENTOR

John R. Boykin

BY Ernest P. Klipfel

ATTORNEY

Nov. 25, 1969 J. R. BOYKIN 3,480,881

CIRCUITRY FOR SIMULTANEOUSLY MODULATING AND AMPLIFYING A CARRIER SIGNAL

Filed Aug. 19, 1966 4 Sheets-Sheet 2

3,480,881

CIRCUITRY FOR SIMULTANEOUSLY MODULATING AND AMPLIFYING A CARRIER SIGNAL

John R. Boykin, Arnold, Md., assignor to Westinghouse Electric Corporation, Pittsburgh, Pa., a corporation of Pennsylvania Filed Aug. 19, 1966, Ser. No. 573,668
Int. Cl. H03k *9/10*
U.S. Cl. 332—9 14 Claims

ABSTRACT OF THE DISCLOSURE

Circuitry for simultaneously modulating and amplifying a carrier signal wherein the carrier signal is used to drive a plurality of power related switching amplifiers in accordance with a digitally coded modulation signal to thereby modulate the carrier with the original modulation signal without waste of power.

The present invention relates generally to modulated amplifiers and more particularly relates to digitally driven modulated amplifiers performing linear modulation at high efficiencies with low quantization distortion.

High power amplification of modulated signals has been accomplished in the prior art by circuitry that has been wasteful of power, or places stringent requirements on the active elements, or both, A linear amplifier must necessarily handle signals that are not constant in amplitude. Prior art circuits used to accomplish this have been wasteful of power because they have produced the levels lower than peak by simply dissipating energy on the plates or collectors of the active elements.

Many attempts have been made to improve the efficiency with varying degrees of success. One such system utilizes a variable phase method wherein two signals, each of constant amplitude so that the active elements can be saturated, but of variable phase relationship, are summed into a load in such a manner that the resulting signal has a variable amplitude. This system does indeed result in a high conversion efficiency, but it places stringent requirements on the active elements and requires many extra active elements when used with a signal that is 100% modulated. The active elements must switch on and off during portions of the wave when the current through them is high. The active elements are required to pass through a period of high instantaneous dissipation, which can endanger them. The high current period of the wave which exists at the time of switching is caused by the quadrature current that flows since the two output signals combining into a common load react with each other in varying degrees as the signal is modulated.

Other prior art circuitry passes the signal to be amplified through an amplitude detector thus deriving an analog signal representing the amplitude of the signal, and simultaneously passing the same signal through an amplifier and clipper thus deriving a second signal of nearly constant amplitude which contains the phase information. This second signal is used as the drive signal of a high level modulated amplifier. The signal derived from the amplitude detector is amplified and used as the modulating signal in the high level modulated amplifier. This system has in the past suffered from the drawback that conventional high level modulated amplifiers are coupled with transformers or Heising choke coils, or both, in order to keep the efficiency reasonably high. This choke or transformer coupling results in a limitation on the low frequency response of the modulator. The amplitude component of a single sideband voice signal contains significant frequency components all the way down to D.C. and the loss of these low frequency components causes serious intermodulation distortion.

The modulated amplifier of the present invention provides linear modulation with little loss of power, and in a manner that causes only insignificant amounts of quadrature current to flow through the active elements. The active elements are not derated for this application. The present invention is peculiarly adaptable as an amplitude modulator in systems such as described above, where the phase and amplitude information are amplified separately and combined at high power. When used as a component of such a system for linear amplification, the frequency response of the circuit as measured from the modulating voltage to the output waveform amplitude has no lower limit. This direct current response to the modulating waveform makes the circuit particularly adaptable to uses where very low frequencies must be used to modulate a transmitter. The frequency response through the modulation channel extends from direct current up to a value that is limited only by the switching speeds of the gates and switches that are utilized therein.

In order to achieve maximum efficiency from transistor amplifiers, they must be operated in the switching mode. This mode of operation is accomplished by driving the transistor into saturation under which condition they approach the "ideal" switch; that is, no voltage drop thereacross when closed and no current therethrough when open. Operating efficiencies for these devices have been measured at 97 to 99 percent. When one thinks of power amplifier efficiency, the load matching network is normally included, so that overall power amplifier efficiency will drop from 90 to 95 percent, depending upon losses associated with the output networks. Although the switching mode of operation is extremely desirable from the standpoint of efficiency, the active elements obviously cannot operate "saturated" and "linear" in the same application; hence, some means for combining the functions is required.

The approach of the present invention is based upon individually controlling the polarity of the RF carrier used as drive, increasing the power in switching mode solid state amplifiers, then combining their outputs to accomplish amplitude modulation. The soundness of such an approach has been tested and proven. The polarity of the drive to each of the switching mode amplifiers can be controlled using one bit of a digital representation of the amplitude of the desired modulated signal. When the output of all of the stages are summed the amplitude is proportional to the amplitude of the modulating signal and the phase is the same as the input signal to the phase inverter even though the amplitude of the output of each stage is a constant.

An object of the present invention is to provide an amplifier capable of highly efficient operation with all the usual modulation methods, including the stringent conditions experienced in linear operation.

Another object of the present invention is to provide a modulated amplifier wherein there are no intentionally dissipative elements within the circuit and wherein essentially all of the input power is converted into useful energy.

Another object of the present invention is to provide a modulated amplifier capable of obtaining any desired output amplitude during a particular increment of time.

Another object of the present invention is to provide an amplifier capable of linear amplification at approximately 90 percent efficiency and with intermodulation distortion products below −40 db attainable for very low frequency and low frequency operation using practical hardware.

Another object of the present invention is to provide an amplifier capable of linear amplification a high efficiency for essentially all modes of operation.

Another object of the present invention is to provide a modulated amplifier having a frequency response as measured from the modulating voltage to the output waveform amplitude which has no lower limit.

Another object of the present invention is to provide a modulated amplifier particularly adaptable to uses where very low frequencies must be used to modulate a transmitter.

Briefly, the present invention accomplishes the above cited objects and advantages by providing a modulated amplifier wherein a plurality of amplifiers operable in a switching mode are mathematically related in their safe operating power handling capabilities. Each amplifier is capable of supplying a constant amplitude signal into a load which is selected to be essentially resistive but varies over a wide range of both positive and negative values. Selection can be made so that the load current would never be called on to exceed the normal full load current of the amplifier. The output of selected amplifiers are then summed in an output circuit capable of combining and matching the output to a load to provide a desired load voltage between zero and peak in quantum steps. The selection of the amplifiers is under the control of an analog to digital converter operating on the waveform of the modulating signal. The modulated amplifier takes a signal and simultaneously modulates and amplifies it.

More specifically, if the amplifiers are binarily related in their safe operating power handling capabilities then one would be capable of supplying $P/2$, another $P/4$ another $P/8$ and another $P/16$, etc. where P is the total peak power expected to be generated by the modulated amplifier. Each amplifier supplies its share of the output power into the load proportional to the described binary relation. Converter means change the amplitude of the modulating signal to digital form and drive binary combinations of the amplifiers to obtain any desired output amplitude during a particular increment of time which may be made to be one or more RF cycles. All the amplifiers driven by the same polarity phase signal, when enabled by their associated binary bits, feed power into a common load. Amplifiers not so enabled will see a resistive load that is negative and are so arranged that they will rectify the power they are receiving from the load circuit and return same to a common power supply so that the returned power will not be wasted. When desired, opposite phase signals can drive these amplifiers to absorb RF power and return the same to the common power supply to increase efficiency of operation.

Each amplifier is controlled by a bit having significance proportional to the safe operating power handling capability of the amplifier. To obtain any required power output, there will always be some combination of the relative polarities of the drive of the amplifiers that will suffice within the quantization error.

Further objects and advantages of the present invention will be readily apparent from the following detailed description taken in conjunction with the drawing in which.

Figure 1:
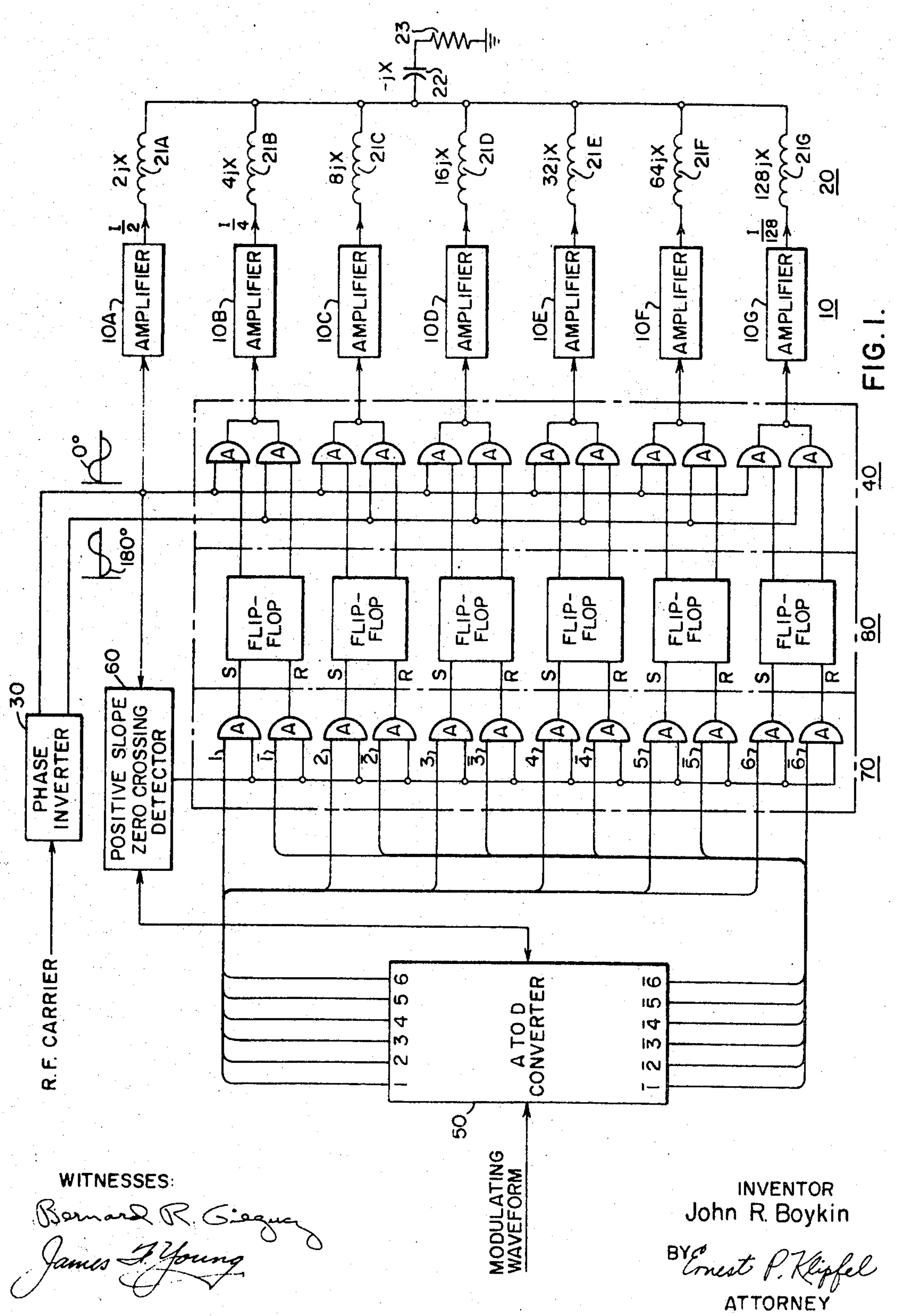
FIGURE 1 is a schematic block diagram of an illustrative embodiment of the present invention.

A modulated amplifier providing the required linear amplification and low quantization noise is shown in FIG. 1. A plurality of amplifiers 10, each operated in a switching mode, feed into a common output circuit 20. The amplifiers 10 will deliver power to the output circuit 20 or absorb power, feeding it back to a common power supply depending upon the polarity of the signal derived from a carrier signal through a phase inverter circuit 30. The phase inverter 30 provides zero degrees and 180 degrees phase signals to first gating circuits 40 which will allow one or the other polarity of the signal to the switching amplifiers 10 when enabled by a pulse coded modulation signal derived from an analog to digital converter 50.

A modulating signal waveform is digitally coded by the A to D converter 50 into a word of weighted bits of decreasing significance. The pulse coded modulation signal sets or resets the logic circuitry 80 through second gating circuits 70 when enabled by a zero crossing detector 60. The pulse coded modulation signal from the logic circuitry 80 enables the first gating circuits 40 to drive the amplifiers 10 with either the first phase signal or the second phase signal from the phase inverter 30. If the amplifiers 10 are binarily related in their safe operating power handling capabilities the selective driving of the amplifiers in response to the pulse coded modulation signal will result in the output power being summed in the output circuit 20 in quantized current steps. A linear response is provided with a quantization distortion which will be determined by the number of bits and amplifiers in the amplifying modulator.

Each amplifier 10 is a basic push-pull circuit amplifying alternate halves of the RF carrier cycle. One possible switching amplifier is as described and claimed in Patent No. 3,239,772 issued to T. L. Dennis, Jr. on March 8, 1966, and assigned to the present assignee. As more fully described therein, active elements are alternately switched on and off generating a square wave as an RF output. The harmonics are readily suppressed by adequate filtering as a combined function with the load matching requirements of the output circuit 20.

The amplifiers are illustrated as being binarily related in their safe operating power handling capability. For example, the amplifier 10A is chosen to be capable of supplying one half the total power $P/2$, while amplifier 10B is capable of one quarter the total power $P/4$, amplifier 10C, $P/8$, amplifier 10D, $P/16$, etc. where P is the total peak power expected to be generated by the transmitter.

Since the modulated amplifier of FIG. 1 is illustrated for straight amplitude modulation with carrier the amplifier 10A is directly connected to the zero degrees phase signal from the phase inverter 30 to be continually driven thereby. It is to be understood however that for suppressed carrier operation the amplifier 10A would be connected to the pulse coded modulation signal from the A to D converter 50 and respond in accordance with the operation of all the other amplifiers 10.

Since there are no intentionally dissipative elements within the system, essentially all of the input power is converted into useful energy. Those amplifiers driven in opposite phase (180 degrees) from the majority will see a load resistance that is negative, and hence are chosen to be capable of rectifying the RF output signal that they receive from the output circuit 20 and return the power to a common power supply so that the return to power will not be wasted.

In FIG. 1, the amplifiers 10 put out and absorb power in accordance with their power ratings in response to the modulation requirements. The amplifiers 10 feed inductance elements 21 having magnitudes which are binarily related. That is, the magnitude of the element 21A is $2jX$ as indicated. The inductive elements 21B through 21G have values of $4jX$ to $128jX$ respectively. The inductive elements 21 resonate with a single capacitor element 22 of magnitude $-1jX$ to feed a load represented by the resistive element 23. Since all the amplifiers 10 put out the same voltage magnitude the reactance of the inductive elements 21 are selected to provide binarily related currents. For example, a current of $I/2$ can flow through the element 21A, a current of a magnitude $I/4$ through element 21B, etc. to a current of $I/128$ through element 21G.

Figure 1A:
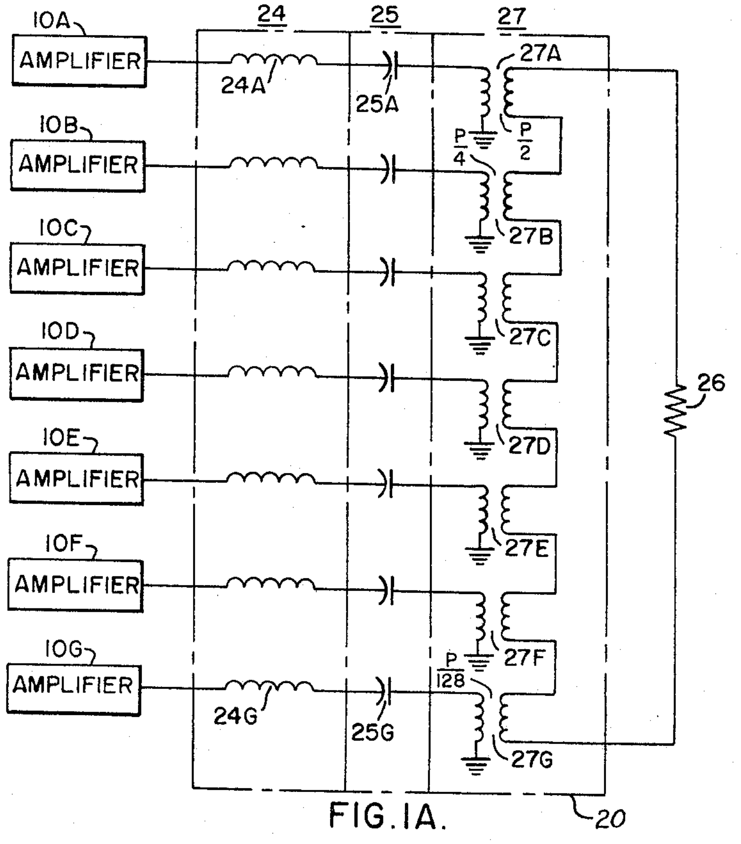
FIG. 1A is a schematic diagram of an alternate network circuit which may be used with the illustrative embodiment of FIG. 1.

FIG. 1A illustrates an alternate output circuit 20 which may be connected to the amplifiers 10 to fulfill the requirements of the present invention. Each amplifier 10 is connected through a series resonant circuit formed by a respective inductive element 24 and capacitive element 25. Each series circuit is resonant at the carrier frequency. Each is coupled into a load 26 through a respective one of a group of transformers 27 having binarily related turns ratios, and having their secondaries connected in series. It is not intended that all of the transformers 27 will necessarily have the same number of turns on the primary, because the transformers will be widely different in size and will be on different cores. But it is the turns ratios that are binarily related. The largest transformer 27A which carries one half of the total power will have a turns ratio of N to 64. The smallest transformer 27G will carry $1/128$ of the total power and have a turns ratio N to 1.

Recent advances in the transformer art has allowed the elimination of the series circuits and hence the elements 24 and 25. Since square wave transformers are now available the amplifiers 10 can be connected directly to their respective transformers 27 to effect an impedance match with the load 26. These amplifiers 10 are combined into the common load 26 through the series connected transformers 27 so weighted that with all the amplifiers driven with the same phase signal each amplifier supplies its share of the output power into the load proportional to the binary relation described previously. The transformers 27 must also have very low leakage reactance so that the reversal of phase driving any amplifier or group of amplifiers will change the resistive component of the load as seen by each amplifier and have little, if any, effect to cause a reactive component.

Figure 2:
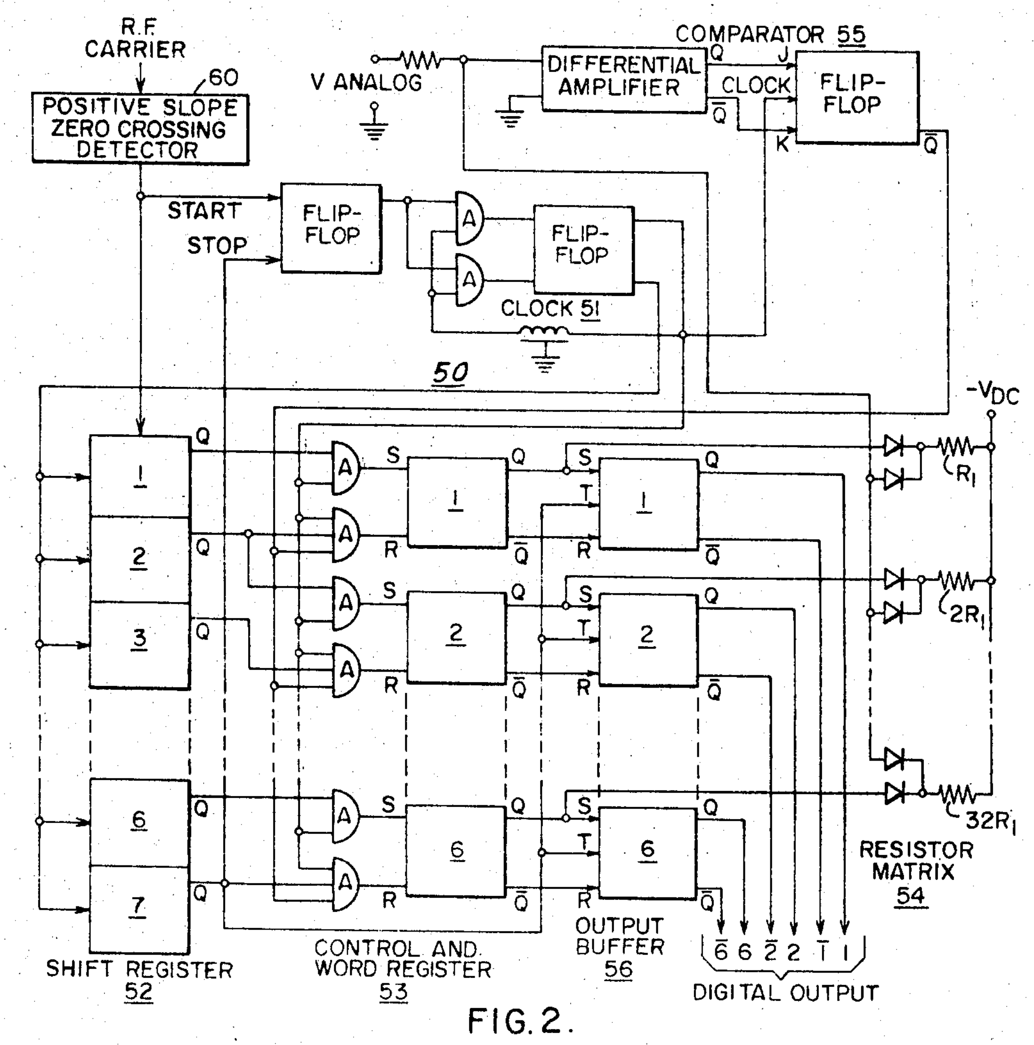
FIG. 2 is a schematic block diagram of an analog to digital converter which may be employed by the present invention.

An analog to digital converter 50 that may be utilized in the embodiment of FIG. 1 is illustrated in FIG. 2. The analog to digital converter 50 accepts the detected envelope of an RF signal, or any modulating signal waveform, as the analog input, quantizes the sampled input to 6 binary bits and applies the 6 bits to the output word. All input signals are positive eliminating the requirement of sign determination. The conversion cycle is started at each positive zero crossing and may require, for example, 7.5 microseconds. The result of the *A/D* conversion is applied to the output lines at the next positive zero crossing.

At each OR selected RF carrier zero crossing of predetermined polarity, a clock 51 is started. The first clock pulse sets the first bit of a shift register 52 and the first bit (most significant) of a control and word register 53. Bits 2 through 6 of the control and word register are reset. The set conditions of bit 1 of the control and word register 53 switches in a resistor $R_1$ in the resistor matrix 54 of a value chosen to balance an analog signal of one half the maximum voltage as seen by the input of a differential amplifier or comparator 55. If the comparator output is negative, indicating an analog input less than one half maximum voltage, bit number 1 is reset by the next clock pulse. If the output is positive, indicating an analog input in excess of one half maximum voltage, bit number 1 remains set and the associated resistor $R_1$ remains in the circuit. The second clock pulse shifts "1" into bit 2 of the shift register 52 setting bit number 2 of the control and word register 53. Bit 2 switches in a resistor identified as $2R_1$ corresponding to one quarter maximum voltage and is reset or left set according to the polarity of the comparator 55 at the time of the next clock pulse. The "1" progresses through the shift register 52 and a word is developed in the control and word register 53 a bit with each block pulse until bit number 6 (least significant) is achieved. The contents of the control and word register 53 are read into an output buffer register 56 with the next positive zero crossing and a new conversion cycle begins.

Referring to FIG. 1, the function of the zero crossing detector 60 is to control the timing of the A to D converter 50 and the logic circuitry 80. The signal inputs to the zero crossing detector 60 are the zero degrees phase signal from the inverter 30 and, if desired, an analog to digital inhibit signal. At each positive slope zero crossing of the inverter output (if no inhibit signal is present) the A to D converter 50 transfers its digital output in parallel to the logic circuitry 80 and commences encoding the new analog input from the modulating signal waveform source. Since this encoding process may require, say, five microseconds, no timing difficulty arises if the time between successive positive slope zero crossings of the inverter output always exceeds 5 microseconds.

This condition is met with carrier sinusoidal signals up to 200 kilocycles at the inverter output. Since the time between successive positive slope zero crossings is affected, not only by the carrier frequency, but also by the type and magnitude of the modulation, such times may occasionally approach zero duration.

The inhibit signal from the A to D converter 50 prevents any output of the zero crossing detector 60 from occurring while the encoding process is underway. Hence satisfactory operation is assured regardless of the minimum time between successive positive slope zero crossings of the inverter output.

A second possible problem may be associated with having a time between positive crossings exceeding, say $1\frac{1}{2}$ times the carrier frequency period. This can only occur if the inverter output becomes too small to activate the zero crossing detector 60. Using representative values for the purpose of illustration, the inverter 30 will supply 100 milliwatts maximum into a 1000 ohm input impedance of the zero crossing detector 30 for a maximum input of 10 volts RMS. The detector 30, which is basically a comparator, will be capable of providing a square wave output for an input as low as 10 millivolts RMS (−40 db below full input). To permit satisfactory operation at lower input signals, the detector 30 will generate a simulated positive slope zero crossing detection every $40\pm5$ microseconds.

Figure 3:
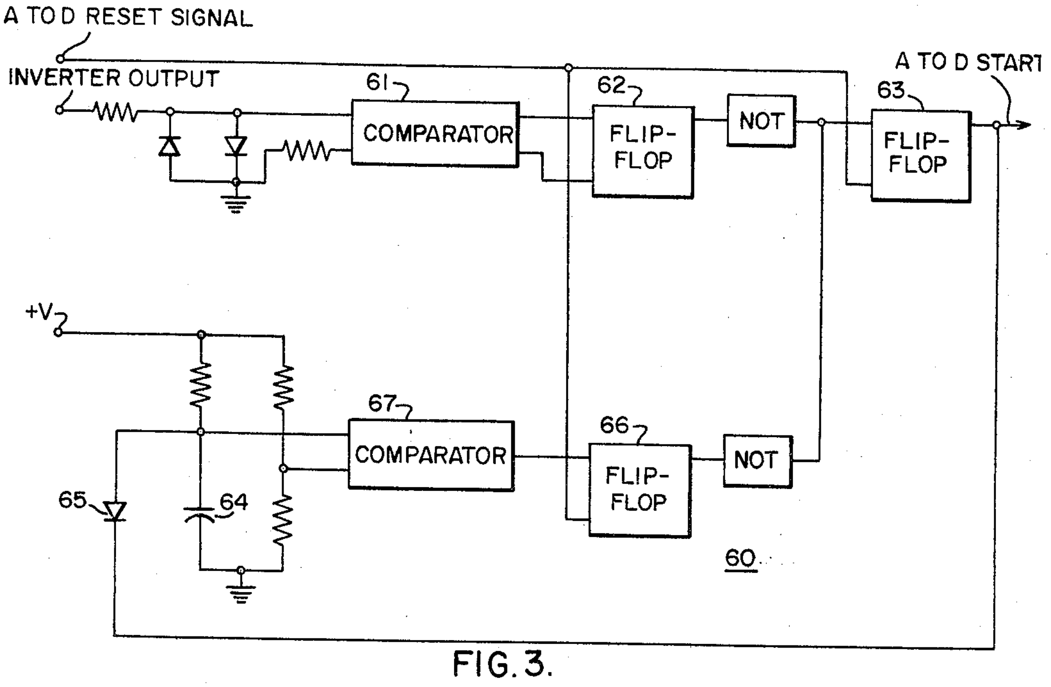
FIG. 3 is a schematic block diagram of a positive slope zero crossing detector which may be employed by the present invention.

The main effects of this mode of operation include: (a) sampling the analog signal at about a 25 kilocycle rate instead of the normal 30 kilocycle to 150 kilocycle carrier frequency rate and (b) changing the output from the logic circuitry 80 at other than actual zero crossing times. Effect (a) is of little significance because the 25 kilocycle sampling rate is still 8 times the maximum modulation frequency of say, arbitrarily, 3.25 kilocycles, and besides, this lower sampling rate only occurs at transmitted power levels of −40 db or less. Concerning effect (b) it is to be recalled that the decision to change the output of the logic circuitry 80 at only zero crossing times was based on the desire to minimize switching transients within the amplifiers 10. With low output power levels such as −40 db or less, this need no longer exist. The operation of a detector 60 is illustrated in FIGURE 3.

As the zero degrees phase inverter signal goes positive, it switches the comparator 61 from a 1 to a 0 level and sets a flip-flop 62 to a one state. This then sets a flip-flop 63 to a one state and signals the A to D converter to start. At this time an integrator capacitor 64 is reset to zero voltage through diode 65. As soon as the A to D conversion operation is completed, flip-flops 62, 66 and 63 are reset and capacitor 64 commences integration.

The setting of the flip-flop 63 will take place via the alternate path activated by integrator capacitor 64 if a positive slope zero crossing does not take place before comparator 67 goes to the zero state. Thus the A to D converter is started every 40 microseconds or sooner.

The logic circuitry 80 stores the digital output of the A to D converter 50 from one positive slope zero crossing time to the next one. Hence, the first gating circuit 40 is provided with selected enabling signals which remain constant while the A to D converter 50 is encoding a new analog input.

Figure 4:
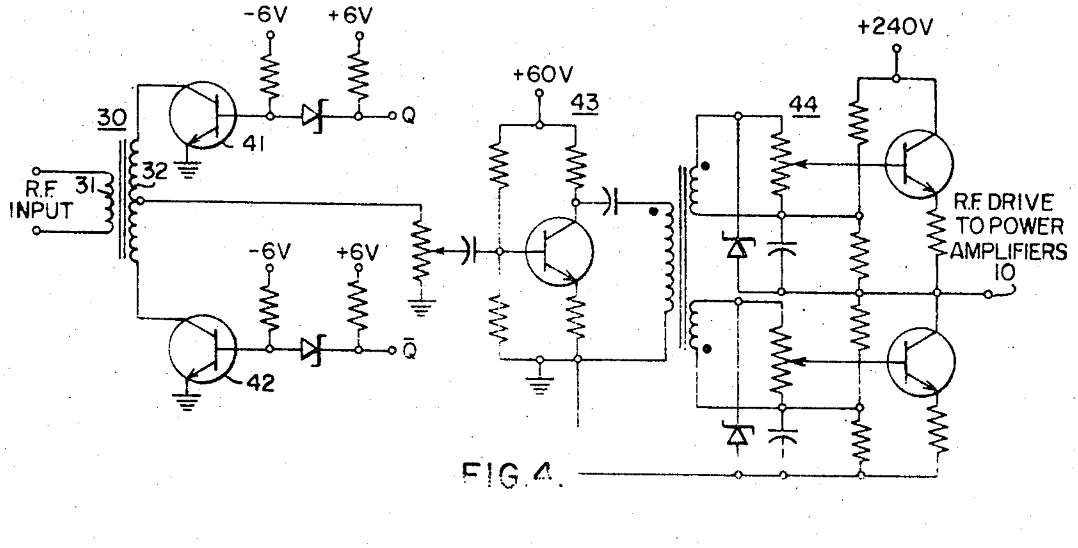
FIG. 4 is an electrical schematic diagram of an RF gate and driver which may be employed by the present invention.

FIGURE 4 illustrates how the first gating circuitry 40 can be combined with drivers for the switching amplifiers 10. The RF carrier is brought into the inverter 30 (which in this case is a transformer with balanced secondary windings) via a primary winding 31. A center tapped secondary 32 provides both phases (0 and 180°) for each amplifier driver. The associated bit Q or $\overline{Q}$ is received from the analog to digital converter 50 through the logic circuitry 80 to selectively render switching devices 41 and 42 conductive or non-conductive. The desired phase carrier signal from the inverter transformer 30 will be provided with a preamplifier 43 which in turn energizes a driver 44. The output of the driver 44, now of the desired phase, is provided with its associated amplifier 10.

It is to be noted that amplifier 10A is illustrated as being continually driven by the zero degrees phase signal. From FIGURE 5 it can be seen to be a simple matter to connect the preamplifier 43A to the secondary winding 32A of the inverter transformer 30A to receive only the zero degree phase signal. The driver 44A then provides an RF signal input of proper phase to the amplifier 10A when the carrier signal is desired in the output circuit 20.

The radio frequency carrier signal is converted to 0° phase and 180° phase signals by the inverter transformer 30. An additional inverter output furnishes the phase signals to the positive slope zero crossing detector 60 for a reference switching time. The modulating waveform or analog signal is converted to digital information by the converter 50 to selectively control the application of the 0° and 180° phase signals to the amplifier drivers 44. The inverter output signals are available to each bit driver with the gates being controlled by the corresponding digital bit from the A to D converter 50.

The RF gates 40 have been more particularly described with reference to FIGURES 4 and 5. One switch 41 will be controlled by the set side of a flip-flop 80 while the other switch 42 is controlled by the reset side. The zero degree phase RF signal is applied to one switch while the 180° phase signal is applied to the other. The result is an output which will be either in phase or out of phase with the bit driver.

Figures 5, 6:
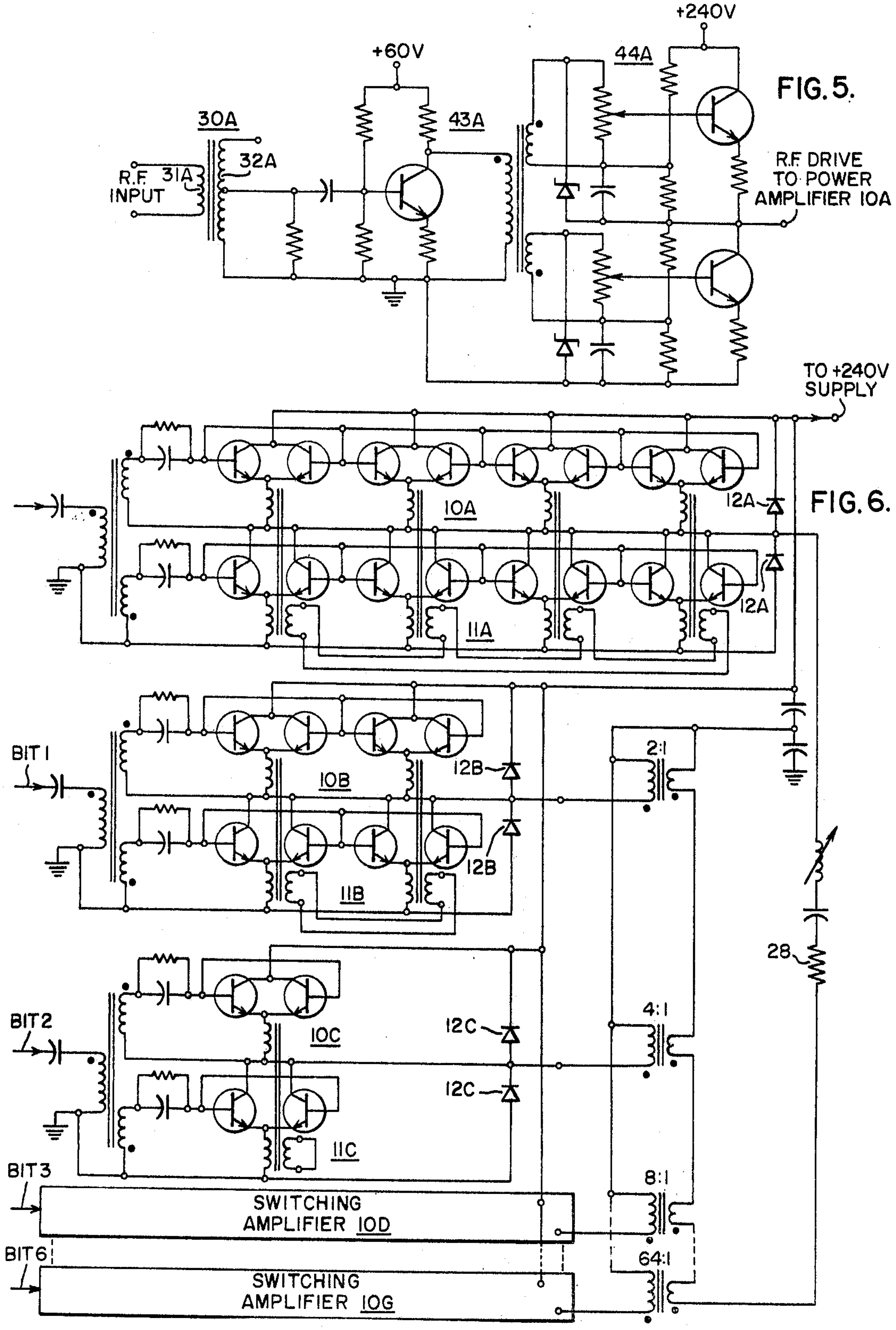
FIG. 5 is an electrical schematic diagram of an RF driver which may be employed by the present invention.
FIG. 6 is an electrical schematic diagram of an amplifier stage and network circuit which may be employed by the present invention.

The switching amplifiers 10 and another alternate output circuit 20 are illustrated in FIGURE 6. The switching amplifiers 10A through 10G are again binarily related in power handling capability with amplifier 10A furnishing ½ of the total power output, amplifier 10B, ¼ etc. Amplifier 10A is always driven to saturation with a signal having the phase of the desired output signal; in this instance the zero degrees phase signal. Each of the other amplifiers 10B through 10G can be driven either with the same signal as the amplifier 10A or by a signal having the exact opposite polarity (180°) to the desired output signal. The switching devices, illustrated as transistors, are parallel to effectively create a large single transistor capable of handling the proper output power. This effective creation of a singel transistor is in part accomplished by the transformer coupling of the transistor emitters. Towards this end the transformer circuit 11 includes a like plurality of transformers for the effectively paralleled transistor groups. The primary of each transformer is serially connected to the emitters of each group. The secondary windings are serially connected to ensure balanced current through the transistor groups.

Each amplifier 10 is transformer coupled in order to get a proper match and to achieve the signal required for the push-pull operation. In comparing the transformer connections of FIG. 6 of those of FIG. 2 it will be noted that in FIG. 2 the amplifiers 10A and 10B are coupled with actual transformers. However, the largest coupling transformer to the output circuit 20 can always be eliminated since it has a turns ratio of 1:1. The second largest transformer, associated with the amplifier 10B can be replaced by an autotransformer since its turns ratio is 2:1. Such a transformer coupling is illustrated in the output circuit 20 of FIG. 6. The weight and cost savings for such an arrangement are of great significance.

The outputs of all the amplifiers 10 are hence serially connected, some through transformers, that have binarily related turns ratios. Since all of the amplifiers are operated from a common power supply the primary voltages of all the transformers are equal. The secondary voltages of these transformers are binarily related in voltage. The amplifier 10A contributes ½ of the total peak voltage across the series group. The remaining amplifiers provide power in accordance with their binary relationship.

Since the secondary currents are all equal by virtue of being in series, the primary currents are binarily related. All of the amplifiers that are driven in the same phase as amplifier 10A contribute power to the output circuit 20, while all the amplifiers driven in the opposite polarity absorb power from the circuit 20. Diodes 12 are connected across the output of each amplifier 10 to provide transistor protection from voltage overshoots and to increase efficiency by power recovery from the output circuit 20. When an amplifier is driven with a signal that is of reverse polarity to that of the signal driving amplifier 10A, a portion of the output power will be rectified and returned as direct current to the power supply that is common to all of the amplifiers. The amount of power fed back is determined by the current in the primary of the transformer and the power supply voltage across the diodes. If the remaining amplifiers 10B through 10G are driven out of phase with amplifier 10A, the total of their voltages across the secondaries of their respective transformers almost exactly equals that of the voltage across the secondary of the transformer associated wtih amplifier 10A with the result that the current through the load 28 is negligible. With amplifiers 10A and 10B driven in the same phase, and all lesser capacity amplifiers driven in the opposite phase, the load voltage and current are each equal to half of the peak; therefore, the power is one quarter of the peak. Under these conditions, amplifier 10A is delivering one half of its capability, which is one quarter of the peak power of the group. Amplifier 10B is also contributing to the extent of one half of its capability being one eighth of the peak capability of the group illustrated. All of the lesser amplifiers, being driven in phase opposition to the amplifiers 10A and 10B, are absorbing power from the RF circuit 20 and returning it to the power supply. The total amount absorbed under these conditions is essentially one eighth of the peak capability of the group. This results in ¼ power being delivered to the load, which is the correct value for the condition of half voltage. This condition of half voltage represents the maximum circulation of power that results in the ultimate efficiency.

Since the switching mode amplifiers generate a square wave as an RF output, adequate filtering must be provided for harmonic suppression, but is easily accomplished as a combined function with load matching requirements of the output network 20. The combined RF amplified signal in the output circuit 20 can be presented to a low Q series resonance circuit which will respond to the step in the outputs of the amplifiers 10 and give a minimum of third harmonic rejection of about 15 db prior to being coupled to the matching transformer. The primary of the matching transformer can be provided with taps to accommodate impedance matching. The secondary can also have taps to accommodate approximate impedance matching of the resistive component of the load presented to the output of a transmitter. Exact impedance matching and final harmonic rejection has been obtained by an output pi-L network which gave a minimum of third harmonic rejection of 35 db for an overall minimum harmonic rejection of 60 db. The tuning is accomplished in eight equal ratio bands with band selection being provided by fixed capacitors and link connected inductors. Fine tuning is achieved by variable capacitors. Hence it is expected that additional networks may be inserted between the transmitter and the load for the purpose of suppression of harmonics and spurious emissions in accordance with practices obvious to those skilled in the art.

Any number of amplifiers 10 may be utilized depending upon the acceptable quantization distortion. In the present invention the approximation to ideal linearity is achieved by applying different amplitudes of digital signals to analog devices (transformers). In each case the smaller the increments of the step elements that are used, the better the resulting linearity and consequently the lower the intermodulation distortion products. For example, if nine amplifier stages are used at full output power, $2^8$ or 256 current steps of the output will be available in response to a linear analog input. The maximum deviation in the output from a perfect linear response is ½ of one step which then would be equivalent to $\frac{1}{2}\times\frac{1}{256}$ of the total current, I. The RMS value is approximately $0.707\times\frac{1}{512}$ which is −57 db below maximum power.

At $\frac{1}{16}$ of full output power, there are $2^6$ or 64 current steps. The RMS of maximum deviation is approximately $(.707)\times\frac{1}{2}\times\frac{1}{64}$ which is −45 db below the output power. Below are tabulated several values of power and their distortion. These figures are based on operating a 100 kw. transmitter at full output and at lower outputs where the output is controlled by the modulation voltage.

| | Distortion, db | Number of bits used |
|---|---|---|
| Power Out, kw.: | | |
| 100 | −57 | 9 |
| 25 | −51 | 8 |
| 6.25 | −45 | 7 |
| 1.56 | −39 | 6 |

The distribution of power of a 25 kilowatt amplifying modulator when divided into 9 amplifier stages can be tabulated as follows:

| | Transistors | Output Power (kw. P.E.P.) |
|---|---|---|
| Power Amplifier: | | |
| 0 | 80 | 12.5 |
| 1 | 40 | 6.25 |
| 2 | 20 | 3.125 |
| 3 | 10 | 1.562 |
| 4 | 6 | .781 |
| 5 | 4 | .390 |
| 6 | 2 | .195 |
| 7 | 2 | .097 |
| 8 | 2 | .049 |
| Total | 166 | 25.000 |

Thus, it should be apparent that ideal or straight line linearity has been closely approached. The quantization distortion can be controlled to any desired tolerance by the addition of additional switching amplifier stages controlled by less significant bits from the pulse coded modulation signal. At the same time operating efficiencies are very attractive since the active elements are driven into saturation where they approach the "ideal" switch. That is, no voltage drop when closed and no current flow when opened. The switching devices of each amplifier will open and close as the carrier signal current goes through zero thereby keeping power dissipation at a minimum. At a high carrier frequency, for example 5 megacycles, the zero slope detector 60 may be omitted. The switching devices in the amplifiers may then be called upon to open and close while current is flowing through them but heat sinks could effectively control temperature dissipation and at the high carrier frequency the resulting transient would quickly die out and disappear.

While the present invention has been described with a degree of particularity for the purpose of illustration, it is to be understood that all alterations, substitutions and modifications within the spirit and scope of the present invention are herein meant to be included.

The present invention has the additional advantage of performing modulation which can be used in amplification at high efficiency for essentially all modes of operation including the following:

(1) Unmodulated continuous wave (A0)
(2) Continuous Wave (CW) telegraphy (A1)
(3) Single Channel frequency-shift telegraphy (F1)
(4) Single Channel frequency-shift facsimile (F4)
(5) Multi-channel frequency-shift telegraphy
(6) Single sideband, reduced or suppressed carrier (A3A) (A3J)
(7) Independent sideband, reduced or suppressed carrier (A3B) (A9B)
(8) Telephony, amplitude modulated (A3)
(9) Multi-channel phase-shift telegraphy.

FCC designations of the various kinds of radio emissions have been shown in parenthesis. It is to be recognized that for some modes the addition of another set of gates and flip-flops and suitable changes in the logic circuitry may be necessary as will be obvious to those skilled in the art. For example when used as a modulated amplifier in a linear amplifier for a single side band signal, the analog audio signal feeding the A to D converter 50 can be derived from an envelope detector. The ½ cycle RF keying can be derived from the zero crossing detector 60 which preserves the RF phasing information.

The unmodulated continuous wave is readily obtainable by utilizing a modulating signal which is of constant direct current. Continuous wave telegraphy can hence be obtained by merely keying the direct current. Single channel frequency shift telegraphy is obtainable when all the information is in the phase of the carrier.

For remote operation such as in satellites, the digitally coded modulating signal can be transmitted from a ground station to a broadcast satellite. Only the carrier signal would be generated abroad the satellite.

While the present invention has been described utilizing transistors, it is to be understood that controlled rectifiers, gate controlled switches and other switching type elements may be utilized. Although circuitry utilizing a six bit code has been illustrated, a lesser number will in many applications provide suitable results.

I claim as my invention:

1. Circuitry for simultaneously modulating and amplifying a carrier signal comprising, in combination;
- analog to digital converter means for digitally coding a modulating signal;
- a plurality of switching amplifiers each having different but related power handling capabilities for supplying an output in quantized steps;
- means for connecting a carrier signal to drive said plurality of switching amplifiers when selectively enabled by said digital coding; and
- circuit means for combining the output from said plurality of amplifiers into a common load.

2. The circuitry of claim 1, wherein said plurality of amplifiers are binarily related in their safe operating power handling capabilities.

3. The circuitry of claim 1 wherein said plurality of amplifiers are responsive to said digital coding for feeding power from said circuit means back to a common power supply in accordance with their power handling capabilities.

4. The circuitry of claim 1 including gating means for enabling said carrier signal to drive selected amplifiers in response to said digital coded modulation signal.

5. The circuitry of claim 4 wherein the amplifier of most significant power handling capability is driven directly by said carrier signal without being enabled by said digital coded modulation signal.

6. The circuitry of claim 4 including means for synchronizing with selected zero crossings of the carrier signal the application of said digital coded modulation signal to said gating means whereby transients in said amplifiers are avoided.

7. The circuitry of claim 6 wherein said means for synchronizing includes memory means for each bit of said digital coded modulation signal and second gating means for enabling the pulse coded modulation signal to set and reset said memory means in response to selected zero crossings of the carrier signal;

said first gating means being enabled by the setting of said memory means.

8. The circuitry of claim 2 including inverter means for converting a carrier signal to 0° phase and 180° phase signals;

each of said plurality of amplifiers connected to be driven by one of said phase signals;

and gating means for enabling said one of said phase signals to drive selected amplifiers in response to said digitally coded modulating signal.

9. The circuitry of claim 8 wherein said gating means enables the other of said phase signals to said amplifiers to return power from said circuit means to a common supply in accordance with their power handling capabilities in response to said digitally moded modulating signal.

10. The circuitry of claim 1 wherein said circuit means includes a reactance element for each amplifier;

a capacitance element;

and a load resistance element;

each reactance element being of a magnitude related to the power handling capability of its associated amplifier;

the sum of the magnitudes of the reciprocal inductance of each reactance element being equal to the magnitude of said capacitance element.

11. The circuitry of claim 10 wherein said reactance elements are chosen to have a magnitude to put out binarily related powers when driven by equal voltage sources.

12. The circuitry of claim 1 wherein said circuit means includes transformer means for each amplifier;

each said transformer means having binarily related turns ratios for connecting output power from each said amplifier to a common load;

each said amplifier having power handling capabilities related to the power handling capabilities of the transformer means connected thereto.

13. The circuitry of claim 12 wherein each of said plurality of amplifiers includes diode means for returning power from said circuit means to the power supply in accordance with the turns ratio of its respective transformer means in the absence of an enabling bit to said gating means in response to said pulse coded modulation signal.

14. The circuitry of claim 4 wherein said gating means includes transformer means including primary winding means connected to receive said carrier signal and secondary winding means each center tapped to connect to an associated amplifier; and switching means connected to selectively ground an end of each said secondary winding means in response to said pulse coded modulation signal.

References Cited

UNITED STATES PATENTS

| | | | |
|---|---|---|---|
| 2,453,461 | 11/1948 | Schelleng | 332—11 X |
| 2,993,202 | 7/1961 | Halonen | 340—347 |
| 3,102,258 | 8/1963 | Curry | 340—347 |
| 3,369,229 | 2/1968 | Dorros | 340—347 |

ALFRED L. BRODY, Primary Examiner

U.S. Cl. X.R.

179—15; 328—14, 38; 332—11; 340—347